(12) United States Patent
Karthik et al.

(10) Patent No.: US 7,616,715 B2
(45) Date of Patent: Nov. 10, 2009

(54) METHOD AND SYSTEM FOR ESTIMATING THE SPEED OF A MOBILE DEVICE IN A NETWORK

(75) Inventors: Muralidhar Karthik, Karnataka (IN); Ser Wah Oh, Johor (MY)

(73) Assignee: STMicroelectronics Asia Pacific Pte. Ltd., Singapore (SG)

( * ) Notice: Subject to any disclaimer, the term of this patent is extended or adjusted under 35 U.S.C. 154(b) by 650 days.

(21) Appl. No.: 10/999,370

(22) Filed: Nov. 30, 2004

(65) Prior Publication Data
US 2006/0114973 A1    Jun. 1, 2006

(51) Int. Cl.
*H03D 1/00* (2006.01)
*H04L 27/06* (2006.01)

(52) U.S. Cl. ............ 375/343; 375/142; 375/150; 375/152; 375/316; 714/796

(58) Field of Classification Search ............... 375/343, 375/142, 150, 152, 316; 714/796
See application file for complete search history.

(56) References Cited

U.S. PATENT DOCUMENTS 6,456,827 B1 * 9/2002 Kubo et al. .............. 455/68
7,095,814 B2 * 8/2006 Kyeong et al. ........... 375/347

* cited by examiner

*Primary Examiner*—Ted M Wang
(74) *Attorney, Agent, or Firm*—Lisa K. Jorgenson; William A. Munck (57) ABSTRACT

A method for estimating the speed of a mobile device in a network is provided that includes selecting a correlation length from a plurality of possible correlation lengths. A correlation result is generated based on the selected correlation length. A speed estimate is generated for the mobile device based on the correlation result.

11 Claims, 4 Drawing Sheets

METHOD AND SYSTEM FOR ESTIMATING THE SPEED OF A MOBILE DEVICE IN A NETWORK

TECHNICAL FIELD OF THE INVENTION

The present invention is directed in general to wireless networks and, more specifically, to a method and system for estimating the speed of a mobile device in a network.

BACKGROUND OF THE INVENTION

The ability of a mobile device, such as a cellular telephone, within a wireless network to estimate its speed is an important part of the device's ability to process signals received from a base station properly. In processing these signals, the mobile device demodulates pilot symbols corresponding to the base station.

The demodulated pilot symbols are the sum of estimates of the fading propagation channel (channel estimates) and background noise in the form of additive white Gaussian noise (AWGN). In conventional mobile devices, the demodulated pilot symbols are averaged by a MA-FIR filter in a channel estimation unit to reduce AWGN power. The number of demodulated pilot symbols that are averaged by the MA-FIR filter to determine one output channel estimate is referred to as the averaging length.

The averaging reduces AWGN power but introduces averaging errors. Thus, the channel estimates are degraded by AWGN, as well as by averaging errors due to fading. As the averaging length increases, the effect of AWGN decreases and the averaging errors increase. As the averaging length increases, the degradation of channel estimates initially decreases before reaching a minimum value and then increasing. Thus, the value of the averaging length for which degradation is a minimum is the optimal value for obtaining the best channel estimates.

Reducing AWGN is dependent on the averaging length; however, averaging errors are dependent on both the averaging length and the speed of the mobile device. As a result, the optimum value of the averaging length is dependent on the speed of the mobile device. Therefore, the speed of the mobile device is estimated in order to select the optimal value of the averaging length and obtain accurate channel estimates.

Conventionally, by calculating a finite number of values of the power spectral density of the demodulated pilot symbols, a mobile device may estimate an upper corner frequency and a lower corner frequency for the power spectral density of the demodulated pilot symbols and may estimate a speed for a mobile device. However, this would require an extremely large amount of processing power and would involve extremely complex computations. Thus, this method of estimating the speed of the mobile device is not feasible.

Alternatively, a smaller number of values of the power spectral density may be calculated in order to reduce computational complexity. However, as the number decreases to the point at which the computational complexity is acceptable, the error in the speed estimation may increase to an unacceptable amount.

SUMMARY OF THE INVENTION

In accordance with the present invention, a method and system for estimating the speed of a mobile device in a network are provided that substantially eliminate or reduce disadvantages and problems associated with conventional systems and methods. In particular, the speed estimation is based on a correlation length that is selected from a plurality of possible correlation lengths, which allows the computational complexity to be reduced without adversely affecting the error in the estimate.

According to one embodiment of the present invention, a method for estimating the speed of a mobile device in a network is provided that includes selecting a correlation length from a plurality of possible correlation lengths. A correlation result is generated based on the selected correlation length. A speed estimate is generated for the mobile device based on the correlation result.

According to another embodiment of the present invention, a method for estimating the speed of a mobile device in a network is provided that includes estimating a first value for a normalized upper corner frequency, $f_m$, of a power spectral density, $X(f)$, for demodulated pilot symbols received at the mobile device based on a first correlation length, $S_1$, in a coarse estimation. A second correlation length, $S_2$, is selected based on the first estimated value of $f_m$. The speed of the mobile device is estimated based on the selected second correlation length, $S_2$, in a fine estimation.

According to yet another embodiment of the present invention, a system for estimating the speed of a mobile device in a network is provided. The system includes a speed estimation pilot correlator that is operable to select a correlation length from a plurality of possible correlation lengths. Using the selected correlation length, the speed estimation pilot correlator is also operable to generate a correlation result for use in estimating the speed of the mobile device.

Technical advantages of one or more embodiments of the present invention include providing an improved method for estimating the speed of a mobile device in a network. In a particular embodiment, the speed is estimated based on a variable correlation length. Thus, a correlation length for use in estimating the speed of the mobile device is selected from a plurality of possible correlation lengths. The correlation length is selected to be a maximum value while still meeting other predetermined criteria. As a result, the number of values of a spectrum of demodulated pilot symbols that is to be calculated for the speed estimate may be reduced. Accordingly, the computational complexity is decreased, while the estimate error remains unaffected.

Other technical advantages will be readily apparent to one skilled in the art from the following figures, description, and claims.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented for any suitably arranged mobile device.

Figure 1:
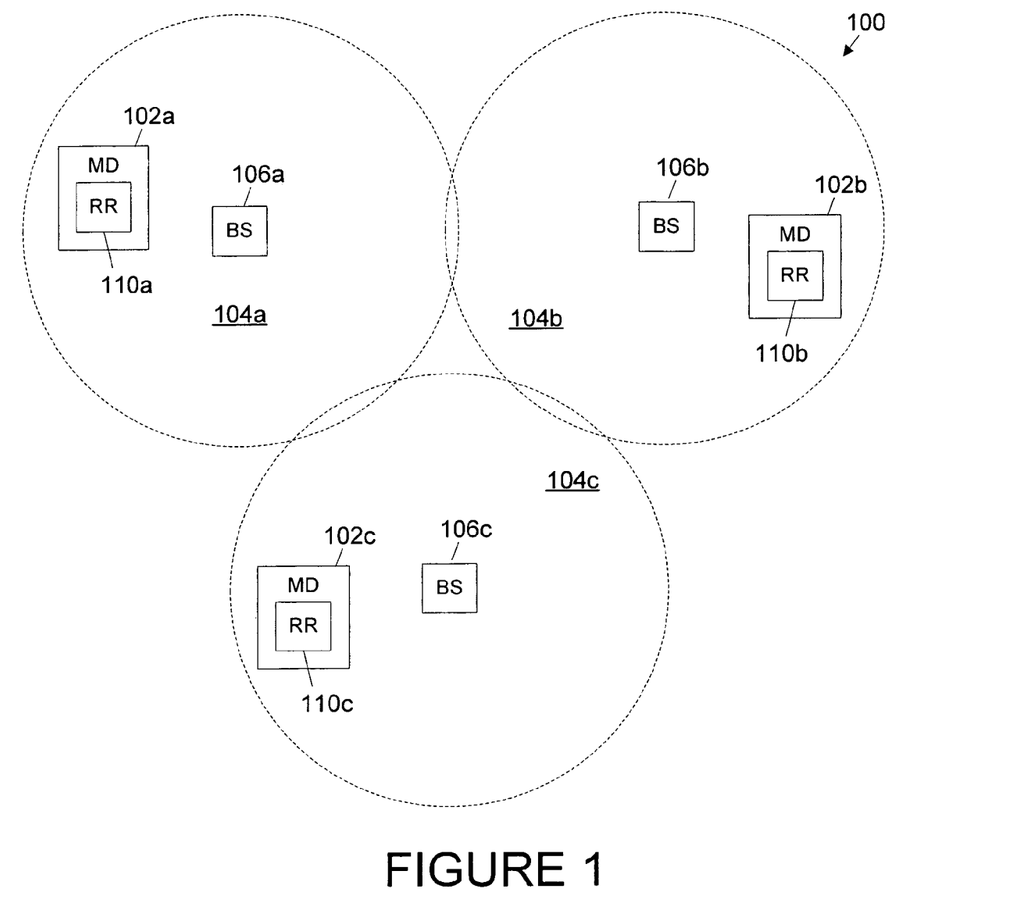
FIG. 1 is a block diagram illustrating a general overview of a wireless network comprising a plurality of mobile devices, each of which is operable to estimate its speed in accordance with one embodiment of the present invention.

FIG. 1 is a block diagram illustrating a general overview of a wireless network 100 comprising a plurality of mobile devices (MDs) 102, each of which is operable to estimate its speed in accordance with one embodiment of the present invention. As used herein, "each" means every one of at least a subset of the identified items. The wireless network 100 also comprises a plurality of cell sites 104, each of the cell sites 104 comprising a base station (BS) 106.

Each base station 106 is operable to communicate with a plurality of mobile devices 102. According to one embodiment, the base stations 106 are operable to communicate with the mobile devices 102 over code division multiple access (CDMA) channels in systems such as a Third Generation Partnership Project (3GPP) Frequency Division Duplex (FDD) mode Wideband CDMA, IS-95, CDMA2000, TD-SCDMA and/or any other suitable communication systems. Each of the mobile devices 102 may comprise a mobile wireless device, such as a cell phone, a PCS handset, a personal digital assistant (PDA) handset, a portable computer, a telemetry device, or the like, or any other suitable device operable to communicate with one of the base stations 106 via wireless links.

Dotted lines show the approximate boundaries of the cell sites 104 in which the base stations 106 are located. The cell sites 104 are shown approximately circular for the purposes of illustration and explanation only. It will be understood that the cell sites 104 may have other irregular shapes, depending on the cell configuration selected and natural and man-made obstructions.

The cell sites 104 comprise a plurality of sectors (not shown), where a directional antenna coupled to the base station 106 may provide service for each sector. The embodiment of FIG. 1 illustrates the base station 106 in the center of the cell site 104. However, it will be understood that the directional antennas may be positioned in any other suitable location.

In the embodiment of the wireless network 100 shown in FIG. 1, mobile device 102a is located in cell site 104a and is operable to communicate with base station 106a. In addition, mobile device 102b is located in cell site 104b and is operable to communicate with base station 106b, and mobile device 102c is located in cell site 104c and is operable to communicate with base station 106c. It will be understood that each of the mobile devices 102 may travel between multiple cells 104 and is operable to communicate with the base station 106 corresponding to the cell site 104 in which the mobile device 102 is currently located.

As described in more detail below in connection with FIGS. 2-4, each of the mobile devices 102 comprises a rake receiver (RR) 110 that is operable to estimate a speed for the mobile device 102 by calculating a relatively small number of values of the power spectrum of demodulated pilot symbols received from the base station 106 currently communicating with the mobile device 102. The rake receivers 110 are operable to do this by selecting between a plurality of possible correlation lengths for correlating the demodulated pilot symbols with an input signal received from the base station 106.

Figure 2:
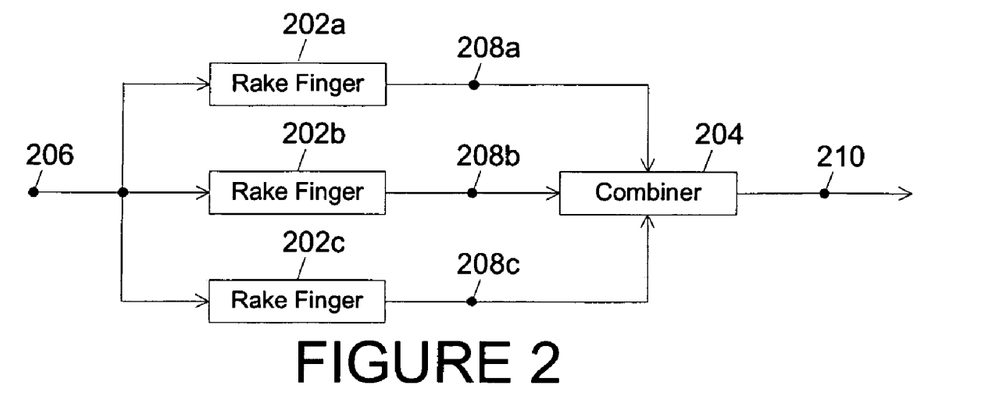
FIG. 2 is a block diagram illustrating details of one of the rake receivers of FIG. 1 in accordance with one embodiment of the present invention.

FIG. 2 is a block diagram illustrating details of one of the rake receivers 110 in accordance with one embodiment of the present invention. The rake receiver 110 comprises a plurality of rake fingers 202a-c and a combiner 204. Although the illustrated embodiment comprises three rake fingers 202, it will be understood that the rake receiver 110 may comprise any suitable number of rake fingers 202 without departing from the scope of the present invention.

The rake fingers 202a-c are each operable to receive an input signal 206, which is the result of RF processing of signals received from a base station 106, and to process the input signal 206 to produce a demodulated output signal 208a-c. The input signal 206 comprises a sum of a plurality of multipath signals that each comprise traffic signals, which are bits corresponding to data symbols, and pilot signals, which are bits corresponding to pilot symbols. Each of the rake fingers 202 is operable to demodulate one of the multipath signals from the input signal 206.

In order to produce the demodulated output signal 208, each rake finger 202 is operable to estimate the speed of the mobile device 102 by calculating a relatively small number of values of the power spectrum of the demodulated pilot symbols within the input signal 206. The rake fingers 202 are operable to do this by varying the correlation length of these demodulated pilot symbols.

The combiner 204 is coupled to the rake fingers 202 and is operable to receive the demodulated output signals 208 from the rake fingers 202 and to combine the demodulated output signals 208 to produce a combined output signal 210, which is provided to one or more other components (not shown in FIG. 2) within the mobile device 102 for further processing.

Figure 3:
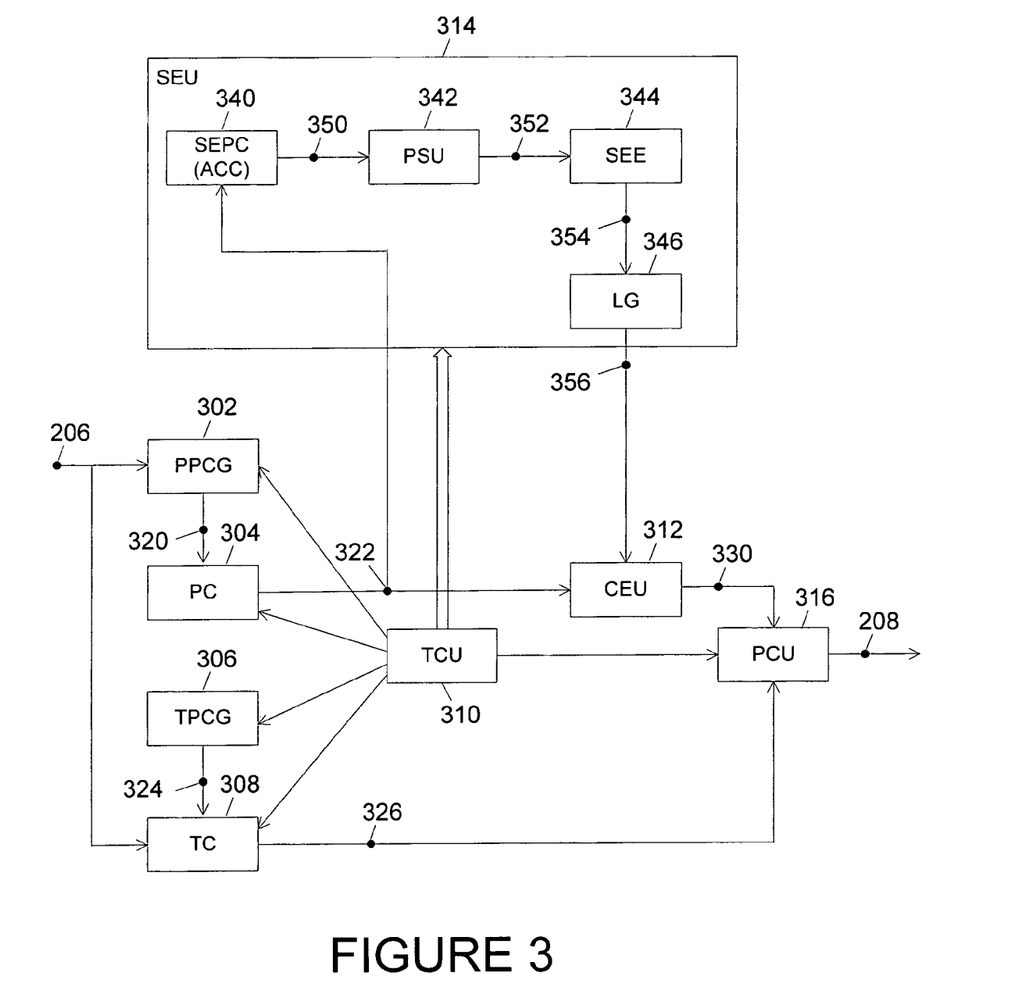
FIG. 3 is a block diagram illustrating details of one of the rake fingers of FIG. 2 in accordance with one embodiment of the present invention.

FIG. 3 is a block diagram illustrating details of one of the rake fingers 202 in accordance with one embodiment of the present invention. The rake finger 202 comprises a pilot pseudorandom (PN) code generator (PPCG) 302, a pilot correlator (PC) 304, a traffic PN code generator (TPCG) 306, a traffic correlator (TC) 308, a timing and control unit (TCU) 310, a channel estimation unit (CEU) 312, a speed estimation unit (SEU) 314, and a phase correction unit (PCU) 316.

The pilot PN code generator 302 is operable to generate a particular pilot PN code 320 for demodulating pilot symbols for the mobile device 102. The pilot correlator 304 is coupled to the pilot PN code generator 302 and is operable to receive the input signal 206 and to correlate the pilot PN code 320 generated by the pilot PN code generator 302 with the received input signal 206. Thus, the pilot correlator 304 is operable to generate demodulated pilot symbols 322 based on the input signal 206 and the pilot PN code 320.

The traffic PN code generator 306 is operable to generate a particular traffic PN code 324 for demodulating data symbols intended for the mobile device 102. The traffic correlator 308 is coupled to the traffic PN code generator 306 and is operable to receive the input signal 206 and to correlate the traffic PN code 324 generated by the traffic PN code generator 306 with the received input signal 206. Thus, the traffic correlator 308 is operable to generate demodulated traffic symbols 326 based on the input signal 206 and the traffic PN code 324.

The correlation length for the pilot symbols comprises the number of inputs, or chips, from the received input signal 206 that is used by the pilot correlator 304 to demodulate one output bit of a pilot symbol. Similarly, the correlation length for the data symbols comprises the number of inputs, or chips, from the received input signal 206 that is used by the traffic correlator 308 to demodulate one output bit of a data symbol. For a 3GPP UTRA-FDD system, the pilot correlator 304 may use a correlation length of 256, while the traffic correlator 308 may use a correlation length of 4, 8, 16, 32, 64, 128, 256 or 512. It will be understood, however, that any suitable correlation lengths may be used without departing from the scope of the present invention.

The timing and control unit 310 is coupled to the code generators 302 and 306 and to the correlators 304 and 308. The timing and control unit 310 is operable to correct the timing of the code generators 302 and 306 and to maintain the time alignment between the code generators 302 and 306 and the input signal 206. Using the timing and control unit 310, the same chip period may be maintained for each chip in the pilot and traffic PN codes 320 and 324.

The channel estimation unit 312 is coupled to the pilot correlator 304. The channel estimation unit 312 is operable to receive the demodulated pilot symbols 322 from the pilot correlator 304 and to estimate the phase delay of the traffic signal 326 based on the demodulated pilot symbols 322. The phase delay is caused by the differing physical lengths of the propagation paths for each multipath signal and the movement of the mobile device 102. The channel estimation unit 312 is operable to generate channel estimates 330 in accordance with the estimated phase delay.

The speed estimation unit 314 may be coupled to the pilot correlator 304 and be operable to receive the demodulated pilot symbols 322 from the pilot correlator 304. The speed estimation unit 314 is operable to estimate the speed of the mobile device 102 either based on the demodulated pilot symbols 322 or based on the input signal 206 and the pilot PN code 320, as described in more detail below.

The speed estimation unit 314 comprises a speed estimation pilot correlator (SEPC) 340, a power spectrum unit (PSU) 342, a speed estimation element (SEE) 344, and a length generator (LG) 346. According to one embodiment, the speed estimation pilot correlator 340 comprises an accumulator that is operable to accumulate one or more outputs 322 of the pilot correlator 304 in order to generate a correlation result 350. As an example, if 10 values of the output 322 are accumulated for every output 350 of the speed estimation pilot correlator 340, the correlation length of the speed estimation pilot correlator 340 is 256*10=2560 (assuming that the pilot correlator 304 uses a correlation length of 256). Henceforth, the term "correlation length" will be used throughout the document to refer to this multiple of the pilot correlator 304 correlation length in accordance with the accumulation by the speed estimation pilot correlator 340. The correlation length used by the speed estimation pilot correlator 340 will be denoted by S (S/256 values of the output 322 are accumulated for each output 350). Although this accumulation of outputs 322 is simpler, it will be understood that the speed estimation pilot correlator 340 may be implemented as an independent correlator that actually is operable to correlate the pilot PN code 320 with the input signal 206 in order to generate outputs 350 without departing from the scope of the present invention.

The speed estimation pilot correlator 340 is also operable to select a correlation length from a plurality of possible correlation lengths. The correlation length selected may be a maximum possible correlation length. For one embodiment, the correlation length may be selected to be a particular multiple of a base correlation length. The multiple may be determined based on any suitable factors such that the correlation length that is selected is increased above the base correlation length, if possible, while still meeting at least one predetermined criterion. One example of the predetermined criterion for selecting a correlation length, which is related to an upper corner frequency of the power spectrum for the demodulated pilot symbols 350, is described in more detail below.

For some embodiments, the possible correlation lengths may vary between 256 and 10,240. For other embodiments, the possible correlation lengths may vary between 2,560 and 40,960. However, it will be understood that the possible correlation lengths may comprise any suitable values without departing from the scope of the present invention. Thus, as opposed to the correlation lengths used by the correlators 304 and 308, the correlation lengths used by the speed estimation pilot correlator 340 are variable and generally much larger.

The power spectrum unit 342 is coupled to the speed estimation pilot correlator 340 and is operable to receive the demodulated pilot symbols 350 from the speed estimation pilot correlator 340. The power spectrum unit 342 is also operable to compute a specified number, N, of values 352 of a power spectrum for the demodulated pilot symbols 350. According to one embodiment, N may comprise 64; however, it will be understood that N may comprise any suitable value without departing from the scope of the present invention.

The speed estimation element 344 is coupled to the power spectrum unit 342 and is operable to receive the N values 352 from the power spectrum unit 342. The speed estimation element 344 is also operable to generate a speed estimate 354 for the mobile device 102 based on the N values 352.

The length generator 346 is coupled to the speed estimation element 344 and is operable to receive the speed estimate 354 from the speed estimation element 344 and to calculate an averaging length 356 for the channel estimation unit 312. It will be understood that the length generator 346 may be implemented independently of the speed estimation unit 314 and coupled to the channel estimation unit 312 and to the speed estimation unit 314 without departing from the scope of the present invention.

The phase correction unit 316 is coupled to the traffic correlator 308, the timing and control unit 310, and the channel estimation unit 312. The phase correction unit 316 is operable to determine a phase delay for the current portion of the input signal 206 using channel estimates 330 received from the channel estimation unit 312 and to correct any phase delay in the current portion of the demodulated traffic symbols 326 generated by the traffic correlator 308.

In operation, according to one embodiment, the speed estimation is performed by first estimating a value for $f_m$, which is the normalized upper corner frequency of the power spectral density (PSD) for the demodulated pilot symbols 350. The following assumptions are made:

(i) The PSD of the demodulated pilot symbols 350 is denoted by X(f).

(ii) N values 352 of X(f) are calculated.

(iii) Z denotes the set of values X(f) that lie in the range $0.4 < f \leq 0.5$ and $-0.4 < f \leq -0.5$.

(iv) $R = \frac{1}{2}(N-Z)$; (R is the set of values in the range $0 < f \leq 0.4$ that are analyzed to determine $f_m$.)

(v) Generally, the condition of $f_m \leq 0.4$ will be satisfied (the correlation length is chosen to ensure this condition is true).

The speed estimation is calculated with the following three steps:

1. The statistical mean of all values in the set Z is calculated and denoted by $I_o$. Next, the maximum frequency element in the set R that is greater than $TI_o$, is located, where T is a threshold. According to one embodiment, the threshold may be selected based on a signal-to-noise ratio and fading characteristics of the demodulated pilot symbols 350.

2. If the maximum frequency element in the set R that satisfies the inequality $X(f) > TI_o$ occurs at the $a^{th}$ element in the set, then $f_m$ is given by a/N.

3. The speed, v, of the mobile device 102 is then estimated using the following equation:

$$v = f_m c / S f_c T_c,$$

where c is the speed of light, S is the correlation length, $f_c$ is the carrier frequency of signals transmitted by the base station 106, and $T_c$ is the chip period.

In accordance with the present invention, the speed is estimated using a coarse estimation and a fine estimation. In the coarse estimation, a coarse estimate of $f_m$ and v are calculated using low computational complexity (e.g., N may be 16, 32, or any other suitable, relatively low value). From the estimate of $f_m$ obtained in the coarse estimation, a fine estimation is performed to obtain more accurate results.

In the coarse estimation, S=2560 is used and $f_m$ is calculated using steps 1-3, above. As just described, N is typically a relatively low value like 16 or 32. Next, a fine estimation is performed. For the fine estimation, a new value for S is selected based on the value of $f_m$ estimated in the coarse estimation as shown in the following table.

| $f_m$ | S |
|---|---|
| $|f_m| \leq 0.02$ | 2560 * 16 |
| $0.02 < |f_m| \leq 0.07$ | 2560 * 4 |
| $0.07 < |f_m| \leq 0.15$ | 2560 * 2 |
| $0.15 < |f_m| \leq 0.4$ | 2560 |

Steps 1-3 are then repeated using the new value of S (selected from the table) in order to calculate the speed.

In this way, by using a coarse estimation followed by a fine estimation, a higher value of S may be used while $f_m$ is prevented from becoming higher than 0.4. Because a higher value of S is used, the value of N may be decreased without affecting the estimation error, which is inversely proportional to the product SN. Thus, computational complexity in the speed estimation, which is, related to the value of N, is also decreased.

Figure 4:
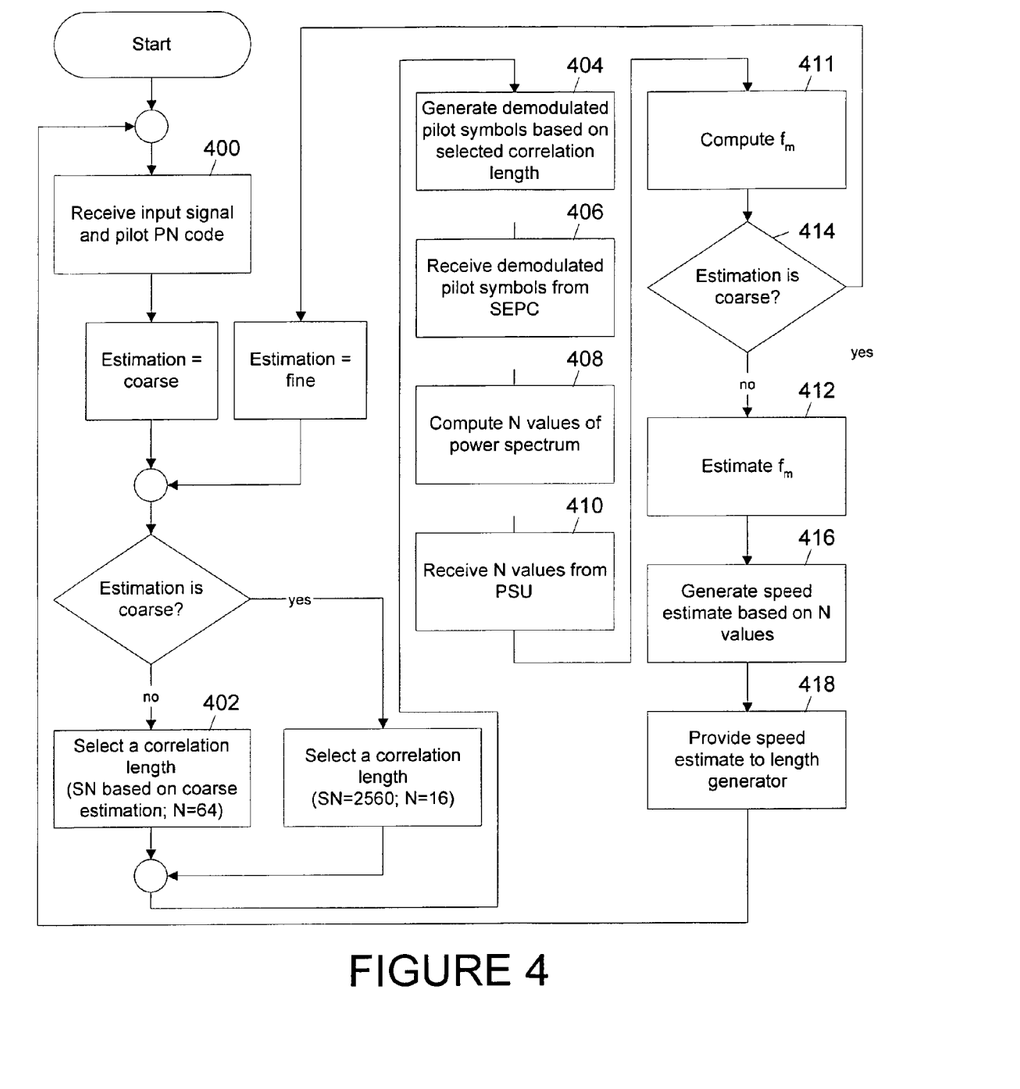
FIG. 4 is a flow diagram illustrating a method for estimating the speed of one of the mobile devices of FIG. 1 in accordance with one embodiment of the present invention.

FIG. 4 is a flow diagram illustrating a method for estimating the speed of one of the mobile devices 102 in accordance with one embodiment of the present invention. The method begins at step 402 where the speed estimation pilot correlator 340 selects a correlation length from a plurality of possible correlation lengths for use in estimating the speed of the mobile device 102. For example, for one embodiment, if a coarse estimation is being performed, the speed estimation pilot correlator 340 may select a correlation length of 2560. However, if a fine estimation is being performed, the speed estimation pilot correlator 340 may select a correlation length based on the results of the coarse estimation.

At step 404, the speed estimation pilot correlator 340 generates demodulated pilot symbols 350. For one embodiment, the speed estimation pilot correlator 340 generates demodulated pilot symbols 350 by accumulating a specified number of demodulated pilot symbols 322 received from the pilot correlator 304. The specified number is based on the correlation length selected in step 402. According to an alternative embodiment, the speed estimation pilot correlator 340 generates demodulated pilot symbols 350 by correlating the pilot PN code 320 with the input signal 206 using the correlation length selected in step 402.

At step 406, the power spectrum unit 342 receives the demodulated pilot symbols 350 from the speed estimation pilot correlator 340. At step 408, the power spectrum unit 342 computes a specified number, N, of values 352 of a power spectrum for the demodulated pilot symbols 350. At step 410, the speed estimation element 344 receives the N values 352 from the power spectrum unit 342. At step 412, $f_m$ is estimated.

At decisional step 414, a determination is made regarding whether or not the estimation being performed is a coarse estimation. If the estimation being performed is a coarse estimation, the method follows the Yes branch and returns to step 402, where a new correlation length may be selected based on the results of the coarse estimation in order to perform a fine estimation.

If the estimation being performed is not a coarse estimation, then a fine estimation is being performed and the method follows the No branch from decisional step 414 to step 416. At step 416, the speed estimation element 344 generates a speed estimate 354 for the mobile device 102 based on the N values 352.

At step 418, the speed estimation element 344 provides the speed estimate 354 to the length generator 346 for calculating an averaging length 356 for the channel estimation unit 312, at which point the method returns to step 402 where the speed estimation pilot correlator 340 may select another correlation length for re-estimating the speed of the mobile device 102, which may change at any time.

In this way, for one embodiment, a reduced number (N) of values 352 of the power spectrum may be calculated using N-point Fast Fourier Transform (FFT) techniques. Because the complexity involved when FFT techniques are used is $N \log_2 N$, the computational complexity is greatly reduced by the reduction in the value of N. In addition, because the estimation error is dependent solely on the product SN, the same estimation error may be obtained using lower values of N and higher values of S in accordance with the present invention as would be obtained using higher values of N and lower values of S.

Although the present invention has been described with several embodiments, various changes and modifications may be suggested to one skilled in the art. It is intended that the present invention encompass such changes and modifications as fall within the scope of the appended claims.

What is claimed is:

1. A method for estimating the speed of a mobile device in a network, comprising:
   selecting, electronically within a speed estimation pilot correlator, a correlation length from a plurality of possible correlation lengths;
   generating, electronically within the speed estimation pilot correlator, a correlation result based on the selected correlation length by accumulating a specified number of demodulated pilot symbols, the specified number based on the selected correlation length; and
   generating a speed estimate for the mobile device based on the correlation result.

2. The method of claim 1, wherein generating a correlation result based on the selected correlation length comprises correlating a pilot pseudorandom code with an input signal using the selected correlation length, the method further comprising:
   receiving the input signal from a base station, the input signal comprising pilot signals, the pilot signals comprising bits corresponding to pilot symbols; and
   receiving the pilot pseudorandom code corresponding to the base station.

3. The method of claim 2, the correlation result comprising demodulated pilot symbols, generating the speed estimate for the mobile device based on the correlation result comprising:
   computing a specified number of values of a power spectrum for the demodulated pilot symbols; and
   generating the speed estimate for the mobile device based on the specified number of computed values.

4. The method of claim 1, wherein selecting the correlation length from a plurality of possible correlation lengths comprises selecting a maximum correlation length that meets at least one predetermined criterion.

5. The method of claim 4, the correlation result comprising demodulated pilot symbols, the predetermined criterion comprising a maximum of 0.4 for a normalized upper corner frequency of a power spectral density for the demodulated pilot symbols.

6. The method of claim 1, wherein the plurality of possible correlation lengths are in the range of 2560 to 40960.

7. A system for estimating the speed of a mobile device in a network, comprising a speed estimation pilot correlator operable to (a) select a correlation length from a plurality of possible correlation lengths, (b) using the selected correlation length, generate a correlation result for use in estimating the speed of the mobile device, and (c) generate the correlation result by accumulating a plurality of demodulated pilot symbols.

8. The system of claim 7, further comprising:
   a power spectrum unit coupled to the speed estimation pilot correlator, the power spectrum unit operable to receive the accumulated demodulated pilot symbols from the speed estimation pilot correlator and to compute a specified number of values of a power spectrum for the accumulated demodulated pilot symbols; and
   a speed estimation element coupled to the power spectrum unit, the speed estimation element operable to receive the specified number of calculated values from the power spectrum unit and to generate a speed estimate for the mobile device based on the specified number of calculated values.

9. The system of claim 8, further comprising a length generator coupled to the speed estimation element, the length generator operable to receive the speed estimate from the speed estimation element and to calculate an averaging length based on the speed estimate.

10. The system of claim 7, the speed estimation pilot correlator operable to select the correlation length from a plurality of possible correlation lengths by selecting a maximum correlation length that meets at least one predetermined criterion.

11. The system of claim 10, the predetermined criterion comprising a maximum of 0.4 for a normalized upper corner frequency of a power spectral density for the demodulated pilot symbols.

* * * * *

UNITED STATES PATENT AND TRADEMARK OFFICE
CERTIFICATE OF CORRECTION

PATENT NO. : 7,616,715 B2
APPLICATION NO. : 10/999370
DATED : November 10, 2009
INVENTOR(S) : Karthik et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1308 days.

Signed and Sealed this

Nineteenth Day of October, 2010

David J. Kappos
*Director of the United States Patent and Trademark Office*